US012670927B2

(12) United States Patent

Haguel

(10) Patent No.: US 12,670,927 B2

(45) Date of Patent: Jun. 30, 2026

(54) SYSTEM AND METHOD FOR DETECTING STRESS IN AUDIO DATA

(71) Applicant: NICE LTD., Ra'anana (IL)

(72) Inventor: Tal Haguel, Petach Tikva (IL)

(73) Assignee: Nice Ltd. (IL)

( * ) Notice: Subject to any disclaimer, the term of this patent is extended or adjusted under 35 U.S.C. 154(b) by 227 days.

(21) Appl. No.: 18/216,699

(22) Filed: Jun. 30, 2023

(65) Prior Publication Data

US 2025/0006218 A1     Jan. 2, 2025

(51) Int. Cl.
H04M 3/54        (2006.01)
G10L 25/63       (2013.01)
H04M 3/42        (2006.01)

(52) U.S. Cl.
CPC ......... G10L 25/63 (2013.01); H04M 3/42365 (2013.01); H04M 3/54 (2013.01)

(58) Field of Classification Search
None
See application file for complete search history.

(56) References Cited

U.S. PATENT DOCUMENTS 6,317,613 B1 * 11/2001 Brown, Jr. ............... H04B 1/66
                                      455/72
11,641,424 B1 * 5/2023 Csabi ................. H04M 3/5183
                                   379/265.11

2010/0185450 A1 * 7/2010 Huang ............... H03H 17/0294
                                   704/500
2011/0119055 A1 * 5/2011 Lee .......................... G10L 19/02
                                   704/502
2011/0173010 A1 * 7/2011 Lecomte ................. G10L 19/20
                                   704/500
2021/0258235 A1 * 8/2021 Peng ....................... G06N 3/084
2023/0281606 A1 * 9/2023 Jakobsson .......... G06Q 20/3674
                                   705/67
2024/0215881 A1 * 7/2024 Henderson ............. A61B 5/165

* cited by examiner

*Primary Examiner* — Quynh H Nguyen

(57) ABSTRACT

A computerized system and method may process and predict stress levels for audio data using a machine learning based framework. A computerized system including a processor and a memory may calculate a buffer length based on a plurality of audio attributes (e.g., of a given audio input or data item), extract an audio buffer from an audio data item based on the calculated length, and predict, using a machine learning model, a stress level for the audio buffer or data item. Some embodiments of the invention may include extracting a buffer of a length determined dynamically for different audio inputs, e.g., to ensure coherency between audio attributes or features extracted from different audio inputs having different audio characteristics. In some embodiments, audio features which may be considered by the model may include, e.g., a plurality of gradients between mel-frequency cepstrum coefficients computed for relevant audio buffers or inputs.

14 Claims, 13 Drawing Sheets

Read audio part → preprocess → Clean audio buffer → Feature extraction → (Numeric representation of audio buffer: gradients between MFCC values) → model → prediction

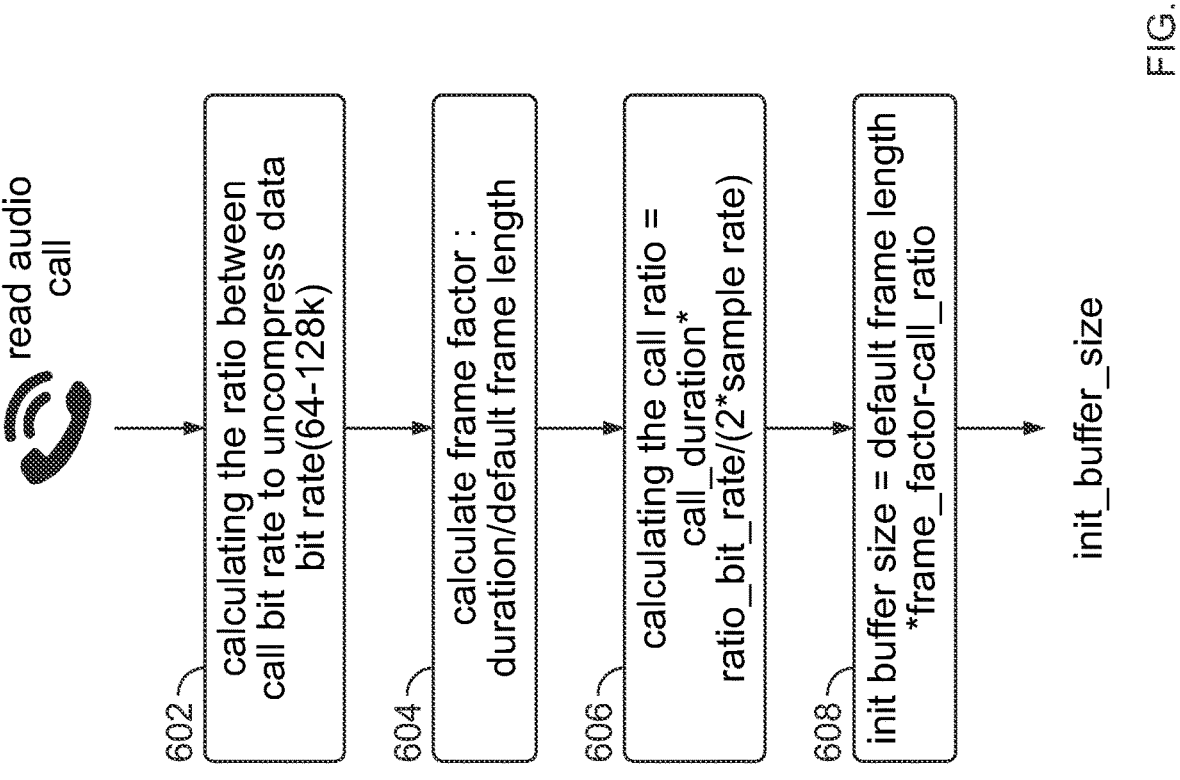

602 calculating the ratio between call bit rate to uncompress data bit rate(64-128k)

604 calculate frame factor : duration/default frame length 606 calculating the call ratio = call_duration* ratio_bit_rate/(2*sample rate)

608 init buffer size = default frame length *frame_factor-call_ratio read audio call default frame size = 4 sec (default audio buffer RTP size)

using nequist law as the best time to sample is 2*sample rate init_buffer_size

FIG. 6

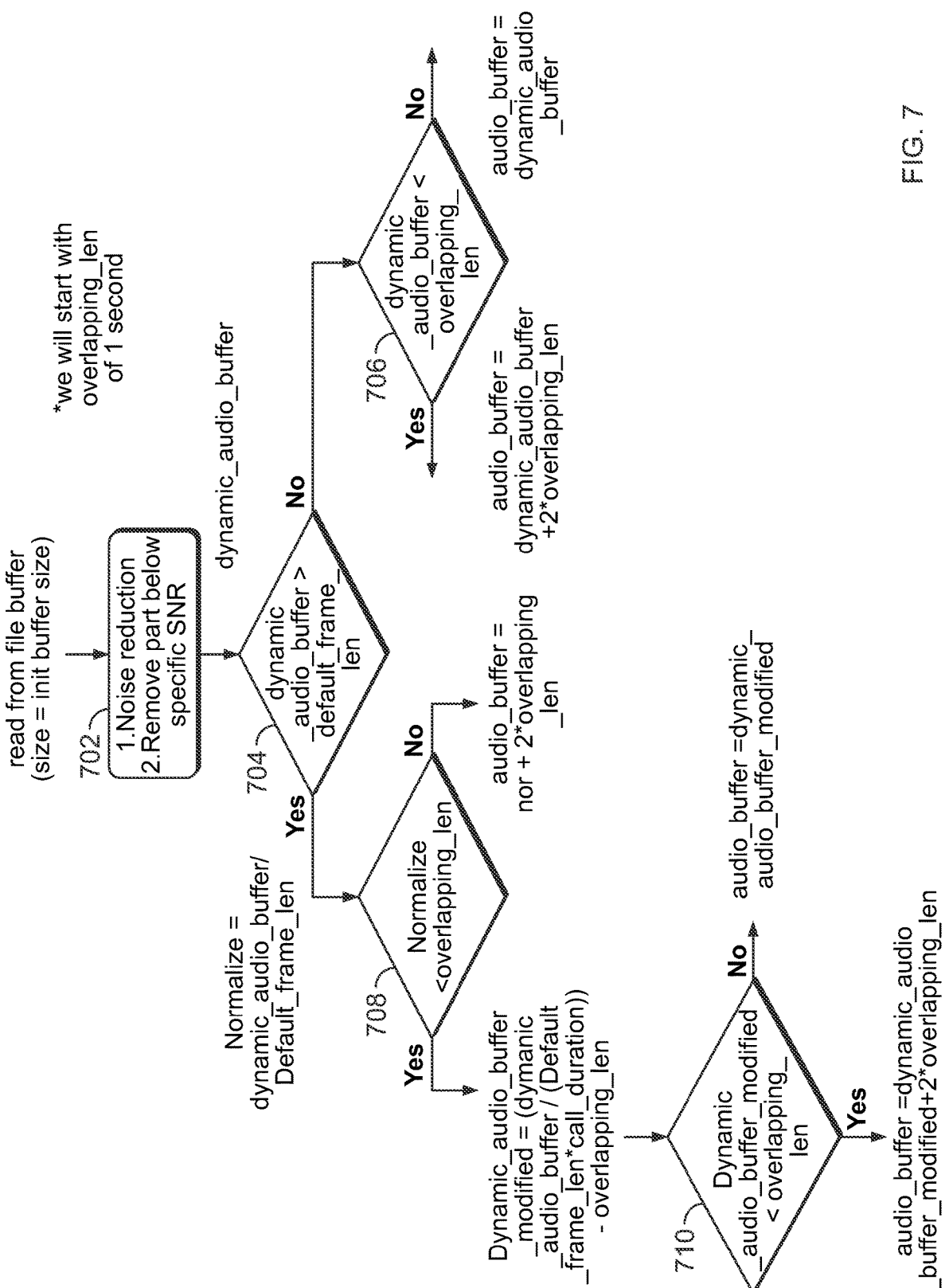

read from file buffer
(size = init buffer size)

702
1.Noise reduction
2.Remove part below
specific SNR dynamic_audio_buffer

*we will start with
overlapping_len
of 1 second 704
dynamic
audio_buffer >
default_frame_
len No Yes 706
dynamic
_audio_buffer <
overlapping_
len No audio_buffer =
dynamic_audio_
buffer Yes audio_buffer =
dynamic_audio_buffer
+2*overlapping_len Normalize =
dynamic_audio_buffer/
Default_frame_len 708
Normalize
<overlapping_len No audio_buffer =
nor + 2*overlapping
_len Yes Dynamic_audio_buffer
_modified = (dynamic
_audio_buffer / (Default
_frame_len*call_duration))
- overlapping_len 710
Dynamic
audio_buffer_modified
< overlapping_
len No audio_buffer =dynamic_
audio_buffer_modified Yes audio_buffer =dynamic_audio
_buffer_modified+2*overlapping_len

FIG. 7

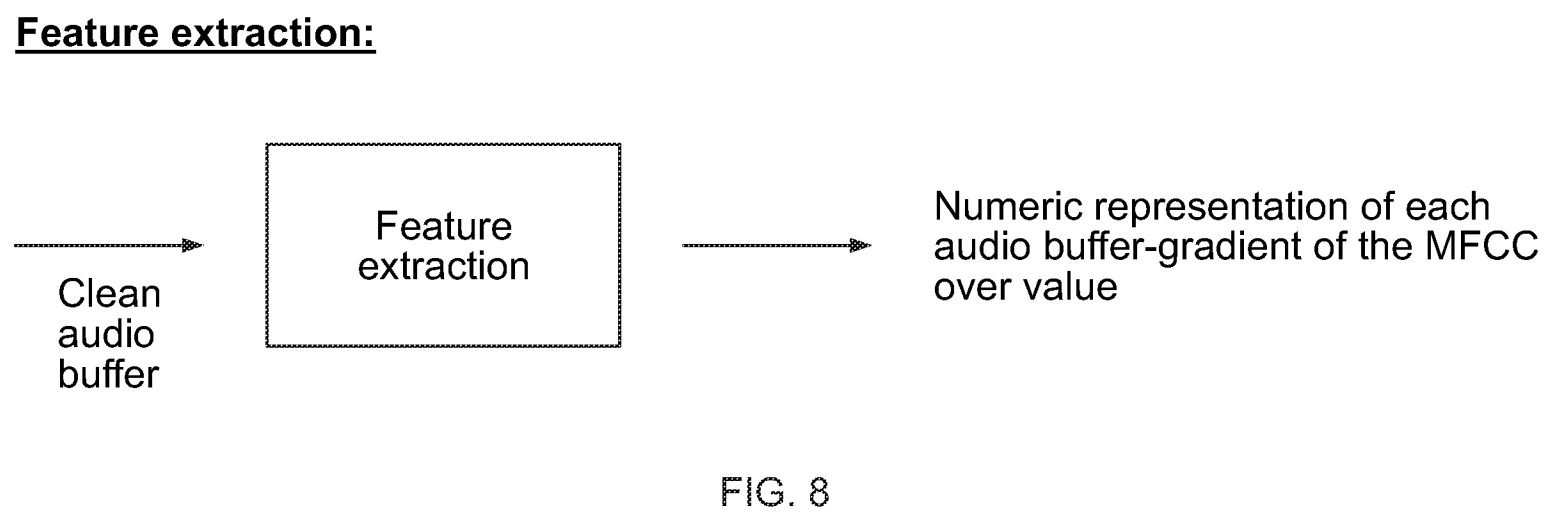

Feature extraction:

Clean audio buffer →

```
┌─────────────┐
│   Feature   │
│  extraction │
└─────────────┘
```

→ Numeric representation of each audio buffer-gradient of the MFCC over value

FIG. 8

1310: Calculate a buffer length based on a plurality of audio attributes

1320: Extract a buffer from an audio data item based on the calculated buffer length 1330: predict, by a machine learning model, a stress level for the audio buffer

SYSTEM AND METHOD FOR DETECTING STRESS IN AUDIO DATA

FIELD OF THE INVENTION

The present invention relates to processing and analysis of audio data, and more particularly to automatic emotion detection in audio data containing human speech.

BACKGROUND OF THE INVENTION

Audio emotion detection technology has generally become increasingly useful in a variety of technology sectors and industries, including healthcare, customer service, and entertainment. By analyzing the audio features of speech, such as tone, pitch, and intonation, emotion detection technology may be used to identify emotions in audio data and/or classify such data according to identified emotions (e.g., in real-time). Some of a great many applications include, for example, identifying signs of stress or depression in patients, improving customer service interactions by detecting negative emotions, and enhancing user experience in virtual reality and gaming environments.

For example, in call or contact centers, agent burnout or churn remains a significant issue with up to 40% of agents leaving every year. Such a high rate of burnout entails substantial costs associated with recruiting, training, and maintaining new agents. Additionally, the lack of expertise in new agents can lead to increased transfers, repeated interactions, and lower customer satisfaction. Especially during and after the COVID-19 pandemic—which induced various stress factors on contact center agents in changing work environments (e.g., remote or hybrid)—detecting stressful audio calls and interactions may be used, e.g., as a basis for churn-reducing interventions.

However, present systems and methods in emotion detection may suffer from various drawbacks and shortcoming relating to, e.g., dataset imbalance and inconsistencies in audio data; and to the challenge of informative variable or feature selection required for ensuring the accuracy and robustness of audio data analysis and classification protocols.

SUMMARY OF THE INVENTION

A computerized system and method may be used for detecting, and/or quantifying, and/or measuring, and/or predicting stress in audio data. In a computerized system including a memory and a processor, embodiments of the invention may calculate an audio buffer or segment length based on a plurality of audio attributes (e.g., of a particular audio input or data item); extract an audio buffer or segment from a given audio data item using the calculated length; and predict, using a machine learning model (which may, e.g., be implemented in a convolutional neural network architecture such as for example described herein), a stress level or score for the audio buffer, segment, or data item.

Some embodiments of the invention may include extracting a buffer of a length calculated or determined dynamically for different audio data items, buffers, or segments provided as inputs, for example in order to ensure coherency and consistency among audio attributes or features extracted from different audio inputs having different audio properties or characteristics (such as for example having different bit rates, frame sizes, and the like).

In some embodiments of the invention, audio features which may be considered by a corresponding machine learning or neural network model (such as for example in the context of training and/or predicting stress levels or scores for audio data) may include gradients between mel-frequency cepstrum coefficients (MFCCs) computed for relevant audio inputs.

While different embodiments of the invention may be used or included in different technological environments, some embodiments of the invention may be used for detecting stress in voice or audio calls within a contact or call center environment. Embodiments of the invention may automatically perform or execute corrective actions, such as for example disconnecting or rerouting a call, based on stress levels or scores predicted for the call or interaction.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 6 depicts an example calculation of an initial audio buffer size or length according to some embodiments of the invention.

FIG. 7 depicts an example dynamic buffer or segment length calculation protocol according to some embodiments of the invention.

FIG. 8 shows a high-level diagram of an example feature extraction procedure according to some embodiments of the invention.

Figure 1:
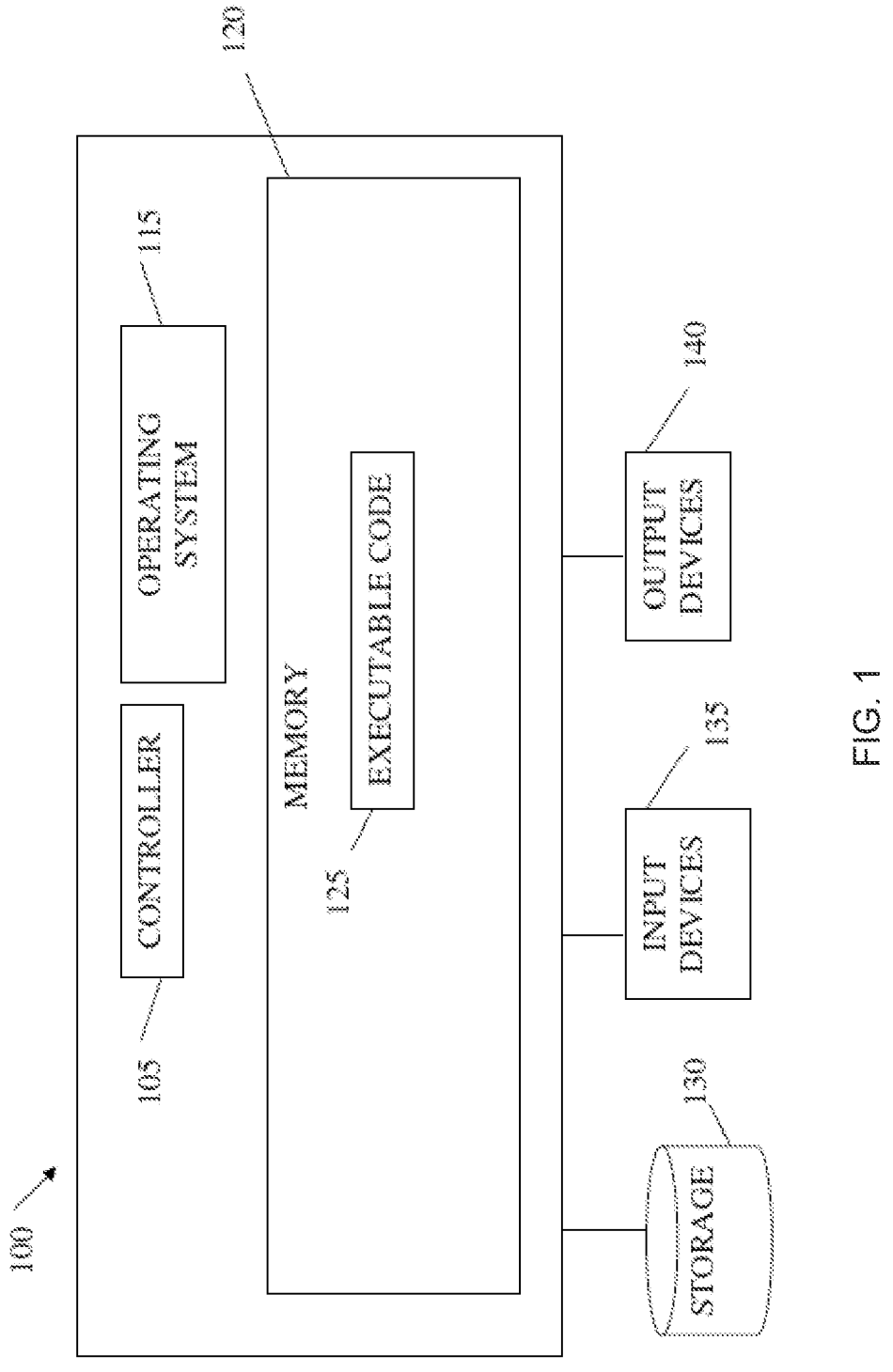
FIG. 1 is a high-level block diagram of an exemplary computing device which may be used with embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may process and predict stress levels or scores for audio data (such as, e.g., audio buffers or segments) using an improved machine learning based approach or framework. A computerized system including a processor and a memory may be used for calculating an audio buffer length based on a plurality of audio attributes (e.g., of a given audio input or data item), extracting an audio buffer from an audio data item using the calculated length, and predicting, using a machine learning or neural network model (which may, e.g., be implemented in a convolutional neural network architecture such as for example described herein), a stress level for the audio buffer or data item.

In the present disclosure, a contact center will be used as a non-limiting example relating to a particular technological environment which may utilize detecting stress according to some embodiments of the invention. Those skilled in the art will recognize, however, that different embodiments may generally be used for various environments including, e.g., remotely connected computer systems, which may not necessarily be limited to computer systems operated by agents in a contact or call center and taking part in voice calls or interactions (for example ones involving user or customer inquiries, technical support, complaints, and the like; see also further discussion regarding an example technological infrastructure of a call center herein). The contact center example in the present disclosure should thus be considered as non-limiting, and terms such as "agent" (and/or "caller", "supervisor", "customers", and the like) may be used interchangeably with uses of other computer systems among a plurality of remotely connected computer systems (or simply "remote computers") which may communicate over a data or communication network. While agents are used herein as an example, embodiments may be used to detect stress among users or employees other than agents.

As another non-limiting example, some embodiments of the invention may be used, e.g., in the context of healthcare system management—which may include or involve detecting stress in audio or video recordings of, e.g., doctor-patient interactions.

In the field of sound-based emotion detection, current systems and methods differ by the "emotions" or groups chosen for classifying audio data. Many existing solutions use different emotion groupings, which can result in various emotion classification and detection inconsistencies. In addition, determining which audio attributes or features should be used for informative audio classification is a long-standing challenge in the art of emotion detection. Different features may be more- or less-informative depending on the type of emotion a given protocol seeks to detect, and the specific dataset being used. Another shortcoming may relate to imbalances in public datasets used by various emotion detection protocols, which can lead to undesirable results in, e.g., training machine learning models to accurately detect emotions in audio data. In addition to inherent difficulties relating to emotion being a multi-faceted phenomenon that is not always easy to reduce to simple, strictly objective criteria (e.g., what are inherent audio characteristics of "sadness"?), using audio data with different properties such as varying duration and sample rate can pose a challenge to emotion detection models. Embodiments of the invention may improve previous systems and methods by providing a systematic audio classification protocol of "stress"/"no stress" states (which may be for example binary and discrete and/or involve a probabilistic approach, as described herein), being based on robust and informative features and being less prone to errors and biases; and by providing a dynamic, varying-length audio data reading and extraction protocol which may ensure audio data coherence, e.g., in the context of training machine learning models for emotion detection.

In this context, embodiments of the invention may include protocols or procedures for selecting and/or extracting an audio buffer or portion from a larger audio data item, where the extracted buffer or portion is typically representative of the source item from which it was extracted (e.g., in some embodiments they should possess similar audio features; see further discussion herein). Embodiments of the invention may first calculate an appropriate buffer size or length for audio buffers or portions which may subsequently be extracted. In this context, for example, the terms "size", "duration", and "length" (e.g., with reference to an audio buffer or data item) may be used interchangeably herein.

FIG. 1 shows a high-level block diagram of an exemplary computing device which may be used with embodiments of the invention. Computing device 100 may include a controller or processor 105 (or, in some embodiments, a plurality of processors) that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of the procedures and/or calculations discussed herein, and the modules and units discussed, such as for example those included in FIGS. 2-13, may be or include, or may be executed by, a computing device such as included in FIG. 1, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or a data store of a plurality of data items describing one or more remote computing devices as further disclosed herein.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 2-13 according to embodiments of the invention. In some embodiments, more than one computing device 100 or components of device 100 may be used for multiple functions described herein. For the various functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data describing one or more remote computing devices, as well as additional and/or different data items, may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out functions, methods and procedures as disclosed herein.

Figures 2, 3:
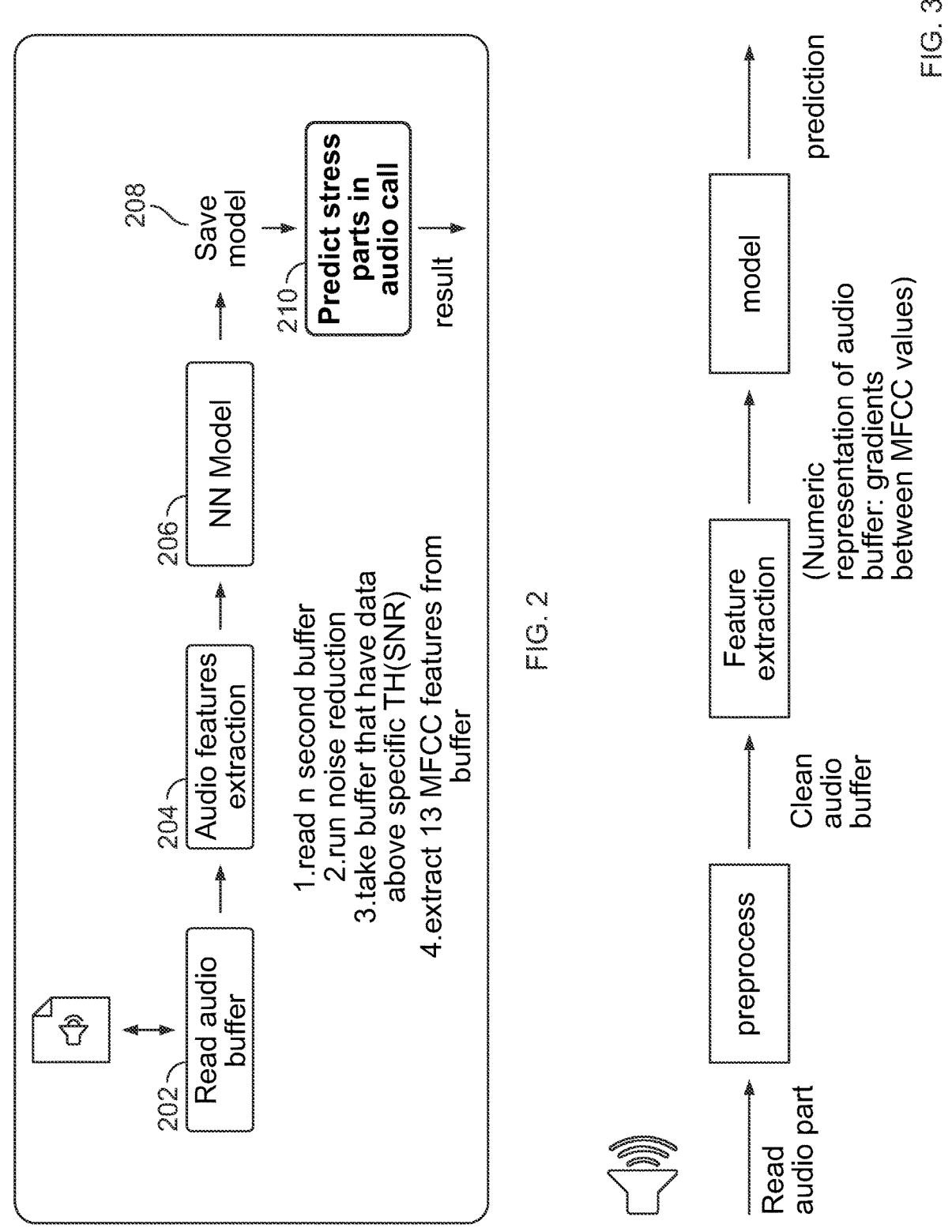
FIG. 2 is a high-level block diagram of an example procedure of stress detection in audio data according to some embodiments of the invention.
FIG. 3 shows a second high-level block diagram of an example procedure of stress detection in audio data according to some embodiments of the invention.

FIG. 2 is a high-level block diagram of an example procedure of stress detection in audio data according to some embodiments of the invention. In step 202, an audio file, or buffer, or segment may be read and prepared for processing. Audio features may then be extracted from the buffer (step 204), e.g., as further described herein. In some embodiments, buffer reading and/or extraction, as well as feature extraction, may include a plurality of sub-steps such as, e.g., running noise-reduction and/or cleaning protocols on the audio buffer, and/or calculating and extracting an initial buffer and/or an updated buffer from the initial buffer (which may be performed, e.g., based on a dynamic buffer size calculation protocol as further described herein), and/or extracting or deriving features from the updated buffer. Extracted audio features may then be input to a machine learning or neural network model (step 206) and for example be used as training data. The trained model may be saved and stored (step 208) and then be used for detecting or predicting stress, or stress levels or scores, in audio calls or data as further described herein (step 210). In some embodiments, audio data input into the trained model for which stress levels or scores may be predicted may similarly be an audio buffer extracted using, or based on, the various protocols and procedures outlined herein.

FIG. 3 shows a second high-level block diagram of an example procedure of stress detection in audio data according to some embodiments of the invention. In addition to slight differences compared to the example workflow in FIG. 2 (e.g., audio buffer or segment is preprocessed and cleaned before a distinct feature extraction step), it is shown that features that may be extracted and used by embodiments of the invention may be or may include, e.g., gradients between mel-frequency-cepstral-coefficients (MFCC). Such features and their constituent elements are further discussed herein. One skilled in the art would recognize that workflows and/or steps additional or alternative to, e.g., the ones outlined in FIGS. 2-3 may be used in different embodiments of the invention.

The term "dynamic" as used herein may refer to a computational procedure which may be considered flexible and responsive to an input on which it operates. In the context of processing or preprocessing audio data as described herein, a "dynamic buffer" or "dynamic buffer length" protocols and/or approaches may refer to, e.g., calculating and extracting audio buffers or segments of varying sizes and/or lengths from different audio inputs, e.g., such that a buffer or segment size calculated for, and extracted from, each audio input may be representative of that specific input and may differ from those for other inputs. In such manner, features extracted from a buffer of the size determined "dynamically" may be coherent or consistent with features extracted from other audio inputs, for which buffers or segments of different sizes or lengths may be extracted. The goal of such dynamic buffer calculation and corresponding extraction procedure may be, for example, ensuring that informative audio segments (which may have high impact on features extracted or calculated for a given audio input) may not be left out or omitted from an audio buffer assumed, chosen, or selected to represent that audio input. It should be noted, however, that while some features of audio data as referred to herein may be associated with or dependent on buffer or segment size or length, other features may be dependent on other variables and factors. Thus, one skilled in the art may recognize that dynamic audio preprocessing procedures and protocols as described herein may relate or consider additional or alternative audio properties (such as, e.g., pitch, audio file format, and the like).

Similarly, a "dynamic buffer" or "dynamic buffer length" as used herein may refer to a buffer or segment size or length calculated and/or extracted using a dynamic calculation and/or extraction approach, such as for example the example protocol further described herein. Some embodiments of the invention may extract audio segments or buffers from different audio inputs based on, or according to, a dynamic buffer size calculation procedure, e.g., in order to ensure coherency between different audio data items and prevent extracting features from defected buffers or audio segments, which might lead to inaccurate features and results.

In some embodiments of the invention, extracted audio buffers representing corresponding audio data items may include, or be divided into, a plurality of audio frames of a given length or duration, where adjacent frames may overlap by a given length or duration—as known in the art of audio data compression for achieving a desirable balance between the computational cost associated with processing and/or storage and corresponding performance of the system or procedure (in such manner, for example, it may be allowed to store and use smaller sized buffers, instead of having to store and use, e.g., the larger source data item itself). In some embodiments of the invention, frame and/or overlap length or duration may, for example, be set based on or according to hardware system components and/or communication protocols used in specific technological environment used for recording and/or generating and/or transmitting relevant audio data items (such as for example ones associated and/or typical to contact center system components and communication protocols used for routing and recording of calls or interactions as further described herein, which may be reflected, for example, and among other things, in bit rates and/or sample rates for the audio items considered). In some embodiments of the invention, e.g., 4 second long frames and 1 second long overlap values may be used, which may, e.g., correspond to a desirable cost-to-performance balance for a real-time transport protocol (RTP) in a contact center environment such as for example depicted in FIG. 11. Other values may be suitable and be used in different embodiments of the invention involving, e.g., different hardware components and/or communication protocols).

As noted herein, a long-standing challenge in the field of audio data analysis relates to a lack of coherency of different audio data items or inputs which may be characterized by different sample rates, bit rates, durations, and the like. If left unaddressed, such lack of coherency may lead, for example, to inaccurate results of feature extraction procedures executed on diverse, different audio inputs or datasets. Embodiments of the invention may improve audio analysis technology by including a preprocessing step, procedure or protocol, e.g., to establish or ensure coherency among a plurality of different audio inputs.

Figure 4:
FIG. 4 shows an example extraction of an audio buffer based on a calculated buffer length according to some embodiments of the invention.

FIG. 4 shows an example extraction of an audio buffer based on a calculated buffer length according to some embodiments of the invention. Based on a fixed buffer size or length which may, e.g., not vary with audio properties of a given input, some embodiments of the invention may extract audio buffers from input data. Audio features may subsequently be extracted or derived from the extracted buffers, and be considered or used as further described herein. However, using a fixed (e.g., non-dynamic, thus inflexible) buffer size or length which may not account for the difference in duration of the audio input might lead to undesirable inconsistencies.

This may be illustrated, e.g., considering a case of a single call or interaction which may be recorded twice, where each input data item or recording have a slightly different duration or length while covering approximately the same audio contents. In the example depicted in FIG. 4, a first buffer 402A, which may include 4 frames and 3 overlap regions (e.g., as per the default frame and overlap lengths considered herein of 4 and 1 seconds, respectively) may represent a first recording of a voice call or interaction characterized by a 10-second duration (note that using frames of fixed value may result in the buffer may include parts of frames which may be partly blank, as known in the art of audio data compression). A second buffer 402B, including 3 frames and 2 overlap regions, may represent a second recording of the same interaction—which may be characterized by an 8-second duration. The corresponding visualizations 404A and 404B of the information content of buffers 402A and 402B, respectively, may illustrate that buffers 402A and 402B and the corresponding recordings may differ substantially by information and corresponding audio features or attributes they "capture" for describing the interaction under consideration. For example, the two buffers 402A and 402B may similarly capture or describe the audio region between seconds 0-7 of the interaction in a similar manner, but since buffer 402B may be shorter and fail to capture information about the interaction described in seconds 8-10—using each of buffers 402A and 402B for representing or describing the interaction under consideration (e.g., as part of a machine learning model as further described herein) may lead to different results.

Figure 5:
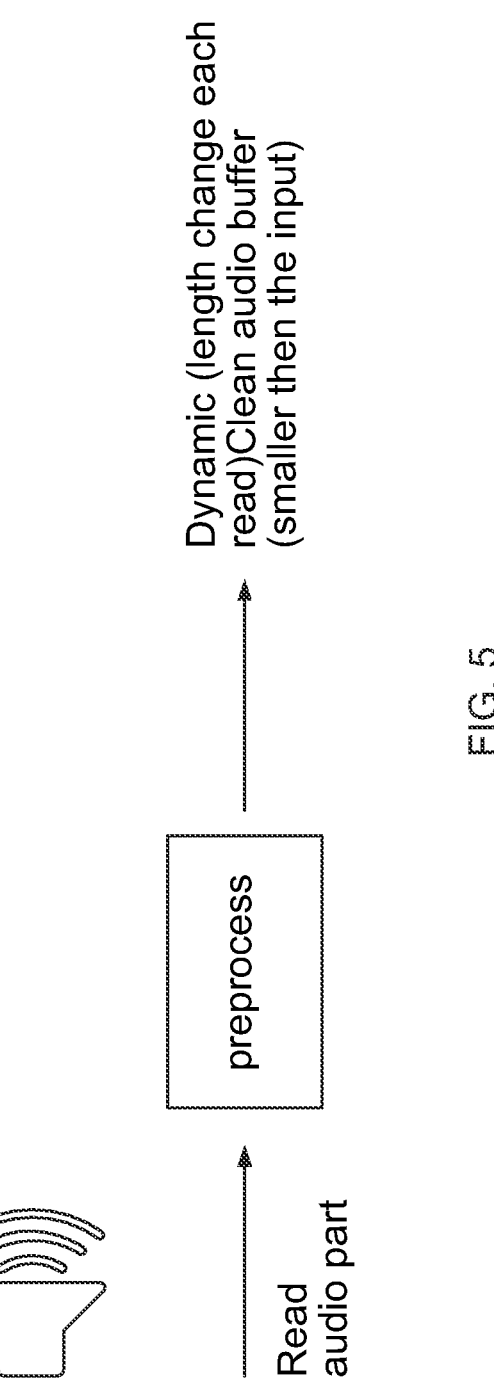
FIG. 5 shows a high-level diagram of an example audio preprocessing procedure according to some embodiments of the invention.

For example, since the two buffers 402A and 402B differ in information content, different features may be extracted for each recording or buffer, and different labeling or classifying the interaction by a corresponding machine learning model as including stress or being stress free (see further discussion regarding mel-frequency-cepstrum-coefficient based audio features and their extraction from a given audio input). Thus, in order to avoid inconsistencies or a potential lack of coherency between audio data items and their audio properties, embodiments of the invention may include a dynamic audio buffer size or length calculation protocol or procedure such as for example further described herein, to capture the most informative parts or segments of an audio input while accounting for audio properties or attributes such as audio duration or length. In this context, it should be noted that while in the example in FIG. 4, a potential inconsistency between audio characteristics or attributes for two recordings of the same interaction may be associated with buffers 402A and 402B being different in length, other potential inconsistencies may result, for example, from buffers being different audio quality as may be reflected in bit rate or sample rate of the buffers extracted. One skilled in the art may thus recognize that dynamic calculations and corresponding buffer extraction procedures and protocols such as further described herein may also be applied to such different audio properties, and not just to buffer length or size, in different embodiments of the invention. FIG. 5 shows a high-level diagram of an example audio preprocessing procedure according to some embodiments of the invention. An audio file, data item, buffer, or segment may be read and used as input for a preprocessing step, for example in accordance with FIG. 3, which may output a processed audio buffer or segment (such as for example an updated audio buffer or segment based on a dynamic calculation of buffer length, as further described herein), from which features may subsequently be extracted. In some embodiments of the invention, a processed or updated buffer or segment may be calculated and extracted from the audio input (e.g., based on a plurality of audio attributes and/or on a "dynamic" buffer calculation procedure as further described herein), and provided as the output of the preprocessing step or procedure. Additional or alternative sub steps and/or operations may be used in different preprocessing protocols used in different embodiments of the invention.

In some embodiments, a preprocessing procedure or protocol which may be applied to a given audio input (e.g., among a plurality of different audio inputs of varying audio characteristics) may include calculating or computing an initial buffer (or segment) size, which may be used or utilized, e.g., in extracting an initial audio buffer or segment which may be further used in subsequent steps of the procedure as described herein.

Figure 11:
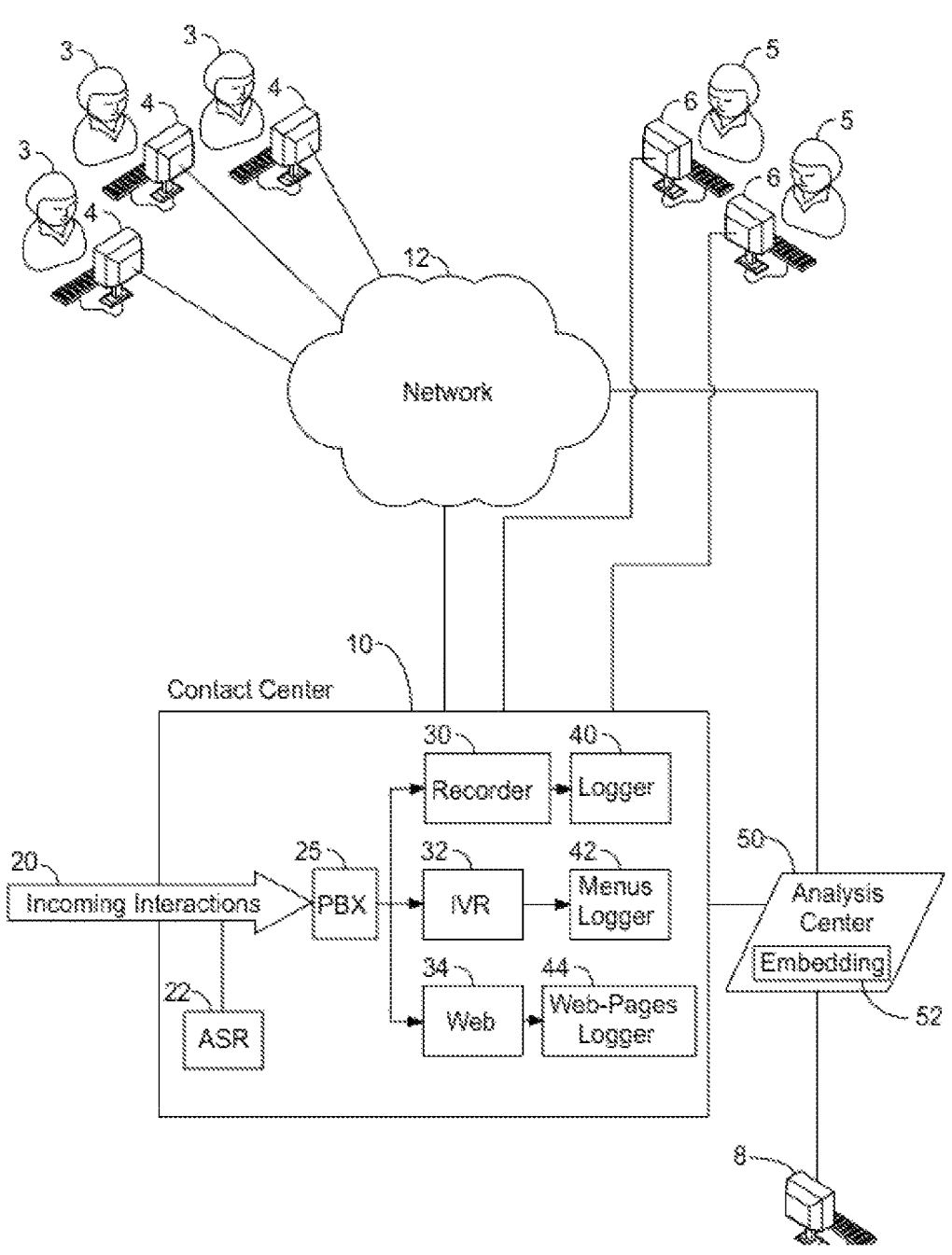
FIG. 11 is a block diagram of remotely connected computer systems according to some embodiments of the present invention.

FIG. 6 depicts an example calculation of an initial audio buffer size or length according to some embodiments of the invention. Embodiments of the invention may calculate or compute a buffer or segment size using a plurality of audio attributes or characteristics of an audio file, buffer or segment received as input—such as for example a frame factor (which may also be referred to as a compression factor), a call ratio (or sample rate factor), and the like—as described herein. Attributes may, for example, reflect a relationship or ratio between a bit or sample rate for high quality audio versus a bit or sample rate for recorded audio (such as for example ones produced or provided using an RTP protocol in a call center environment including a private branch exchange (PBX) system, e.g., as depicted in FIG. 11), and/or a plurality relationships between recorded audio attributes (such as for example size or length) and corresponding reference or benchmark values (which may for example be predetermined and/or set to default values depending, e.g., on computational cost-to-performance considerations as known in the art). Following the reading or receiving of an audio input or data item (such as, e.g., a voice call or interaction in a contact center), embodiments may calculate a ratio between the bit rate of the input (which may be, in some embodiments, 64 kilobyte-per-second (kbps), although different bit rates may be used in different embodiments and corresponding technological environment) and that of uncompressed audio data (which may for example range between 64-128 kbps depending, once again, on the technological environment for a given embodiment; step 602). Embodiments may then calculate a compression or frame duration factor (step 604), which may be, for example:

$$\text{frame factor} = \frac{\text{input duration}}{\text{default frame length}} \qquad \text{(eq. 1)}$$

Where the input duration may be the length of the audio data item under consideration, e.g. in seconds, and the default frame length or size may be a constant e.g., 4 seconds (as the default frame size described herein with regard to some embodiments of the invention, and being used in the RTP protocol, although other values may be used in different embodiments including different audio protocols and corresponding system components). Embodiments may subsequently calculate a call ratio or sample rate factor (step 606), which may be, e.g.:

$$\text{call ratio} = \text{input duration} * \frac{\text{bit rate ratio}}{\text{default sample rate}} \qquad \text{(eq. 2)}$$

where the bit rate ratio may be taken as the value calculated in step 602, and the default sample rate may be, e.g., twice the time of the audio input's sample rate (e.g., in Hz) according to Nyquist theorem and as known in the art of audio data compression—which in some embodiments may vary, e.g., between 8-44.1 kHz, depending on different audio attributes for audio data items as may be recorded and transmitted using an appropriate PBX and the RTP protocol (such as ones included or used within a contact center environment as described herein). A buffer or segment size may then be calculated (step 608) using, or based on, audio attributes or characteristics such as the calculated frame factor (or compression factor), call ratio (or sample rate factor), and the like, e.g., as:

$$\text{initial buffer size} = \text{default frame length} * \text{frame factor} * \text{call ratio} \qquad \text{(eq. 3)}$$

Based on or using the calculated size or length, a buffer or segment of a corresponding size may subsequently be extracted or copied from the corresponding audio data item or file—and then stored and be used, e.g., in subsequent steps of audio stress detection procedures or in additional preprocessing protocols as further described herein. It should be noted that additional or alternative audio attributes or characteristics, factors, formulas, and default values may be used or chosen as part of calculating a buffer size by different embodiments of the invention (where the calculated size may be for example an initial buffer size, which may be subsequently used in a dynamic buffer extraction procedure as described herein).

FIG. 7 depicts an example dynamic buffer or segment length calculation protocol according to some embodiments of the invention.

In the example procedure outlined in FIG. 7, a buffer (or segment) size or length may be calculated, computed or selected dynamically, and a final or updated audio buffer (e.g., a final buffer) may be extracted from a corresponding audio data item or initial audio buffer (e.g., a buffer extracted based on a calculated initial buffer size, such as for example using Eq. 3) based on the dynamically calculated buffer size.

Once an audio input (such as an audio file, or buffer/segment extracted based on a calculation of an initial buffer size or length as described herein) is received or read, embodiments of the invention may first perform of execute a noise reduction or audio cleaning procedure on the input, and, e.g., remove a plurality of noisy audio parts for which a signal to noise ratio (SNR) is found to be below a predetermined threshold (step 702). One example noise reduction procedure which may be used in some embodiments of the invention may be or may include calculating the average SNR for a plurality of audio data items or sample in a given dataset (for example all samples or items in the training set used for training a machine learning model as further described herein), and remove audio parts from the samples for which a lower SNR may be calculated—although additional or alternative procedures may be used in different embodiments. Following the removal of noisy audio parts from the input, an initial or first dynamic buffer or segment may be received, computed or calculated by embodiments of the invention which may include dividing the cleaned input or buffer into a plurality of frames, where adjacent frames may overlap, and where frame and overlap lengths values may be of 4 and 1 seconds, respectively, and/or otherwise determined as described herein.

Embodiments of the invention may then adjust or modify the dynamic buffer size, e.g., using or based on a series of comparisons to various values or thresholds, and/or using or based on the underlying plurality of overlapping frames, or audio frames partly overlapping with one another, within the audio buffer or segment and their characteristics. For example, embodiments may compare the initial dynamic buffer length to a default frame length value (such as, e.g., 4 seconds, as referred to with regard to FIG. 6; step 704). If the dynamic buffer length is shorter or equal to the default frame value (e.g., if the buffer length is not larger than the default frame length), embodiments may proceed to compare the dynamic buffer length to the frame overlap length (which may for example amount to 1 second as considered with reference to FIG. 4 herein; step 706). If the dynamic length is shorter than the overlap length, embodiments may adjust and set the value of the dynamic audio buffer length to include two additional overlap lengths (which may amount to, for example, the initial dynamic buffer length plus 2 seconds). Otherwise, embodiments may select the existing dynamic buffer length as the length for an updated audio buffer (which may subsequently be extracted from the source audio item or buffer).

If the dynamic buffer's length is larger than the default frame length, then embodiments may normalize the dynamic buffer length by dividing it by the default frame length. Embodiments may then compare the normalized size or length to the frame overlap length (step 708). If the normalized dynamic buffer size or length is not shorter than the overlap length (e.g., it is equal or larger/longer than the latter), embodiments may adjust and set the updated audio buffer length as that of the normalized dynamic buffer length plus, e.g., two additional overlap lengths. Otherwise, embodiments may further modify or set the value of the normalized buffer length, for example, based on example eq. 4:

$$\text{modified buffer size} = \qquad\qquad\qquad\text{(eq. 4)}$$
$$\frac{\text{normalized dynamic buffer length}}{\text{default frame length} * \text{input duration}} - \text{overlap } legnth$$

where the default frame length and input duration may be, e.g., the ones referred to in the context of FIG. 6 herein. Finally, embodiments may compare the modified buffer length to the overlap length (step 710). If the modified length is shorter than the overlap, embodiments may set the value of an updated audio buffer length to that of the modified buffer length plus, e.g., two additional overlap lengths. Otherwise, embodiments may set the value of an updated audio buffer length to that of the modified buffer length.

A dynamic buffer (or segment) size (or length) calculation procedure such as, e.g., the example procedure outlined in FIG. 7 may thus be combined with an initial buffer size or length calculation procedure such as, e.g., the example procedure outlined in FIG. 6—to output a dynamic buffer length which may for example capture informative content in a given input audio item while accounting for different in sizes or lengths for inputs of different audio characteristics (and having, for example, different durations, sample and/or frame rates, and the like). Subsequently, embodiments may extract an updated audio buffer or segment from a given input based on the calculated dynamic buffer or segment size, and, e.g., collect or store a plurality of updated buffers from different audio data items-which may be further used in, for example, audio feature extraction protocols and/or additional or alternative procedures described herein.

For example, it may be realized that a dynamic buffer length calculation procedure such as for example illustrated in FIG. 7 may allow processing buffers 402A and 402B in FIG. 4 such that the difference in information content between them is minimized-which may enable using each buffer as representative of the call or interaction considered, and inputting either one into a machine learning or neural network model for predicting stress in audio data as described herein (e.g., as training data or as an input for which a stress level should be predicted) without expecting biases or errors associated, e.g., with differences in audio duration or length as discussed herein.

In some embodiments, the updated buffer may be extracted, e.g., from a previous buffer which may itself have been extracted based on a calculated initial buffer size, for example according to the procedure depicted in FIG. 6 (e.g., in case the updated buffer is shorter than the initial buffer length). In other embodiments, the updated buffer may be extracted from the source audio data item from which a previous buffer may first be extracted and used as an input for a dynamic buffer calculation such as for example illustrated in FIGS. 6-7. In addition, in some embodiments, buffer lengths added dynamically to the initial buffer size (such as frame overlap lengths added throughout the procedure described in FIG. 7) may be added from the end of the initial buffer length (such that an updated buffer longer by additional overlap lengths with respect to the initial buffer size may be extracted from the relevant audio data item), although other ways of adding buffer lengths may be used in different embodiments (e.g., adding overlap lengths or increments from the beginning, etc.). One skilled in the art may recognize that additional or alternative steps, and/or formulas and/or values used for normalization and/or modification of the dynamic, calculated buffer length may be used in different embodiments of the invention.

FIG. 8 shows a high-level diagram of an example feature extraction procedure according to some embodiments of the invention. A clean or preprocessed audio buffer (such as, e.g., a buffer provided as output of an audio preprocessing protocol as discussed herein with reference to FIGS. 5-7) may first be received as input. A feature extraction procedure, including, for example, some of the protocols and procedures further outlined herein, may be performed or executed—to provide a plurality of features or characteristics which may subsequently be input to a machine learning model as further described herein. In some embodiments, features or characteristics may be or may include a numeric representation of gradients between mel-frequency-cepstrum-coefficients (or MFCC gradients as described herein) for the buffer under consideration (see corresponding discussion herein). It should be noted, however, that other features or characteristics, as well as different workflows including additional or alternative steps or protocols, may be used in the context of feature extraction procedures and in training machine learning models for predicting stress levels or scores in audio data as part of different embodiments of the invention.

Some embodiments of the invention may include or involve computing, calculating, or deriving audio features from a mel-frequency-cepstrum (MFC; cepstral representations may also be known as a "spectra-of-a-spectrum") describing a given audio buffer, segment, or data item (such as for example the extracted or updated buffer as described herein). MFCs may generally serve as a valuable representation of a short-term power spectrum of a sound or of audio data. An MFC may be generated, e.g., by applying a linear cosine transform to the log power spectrum of the sound, which is computed based on a nonlinear mel scale of frequency. The fundamental distinction between, e.g., a general cepstrum and the mel-frequency cepstrum lies in the fact that the frequency bands in the MFC are equally spaced on the mel scale. For this reason, the mel scale may be suitable for representing, e.g., human auditory systems (in which, for example, perception of sound frequencies is known to follow a-linear, and sometimes exponential trends). In addition, the mel scale may offer a more compact representation of sound compared to the linearly spaced frequency bands utilized in other types of spectra or cepstra. Consequently, mel scale based audio representations may be useful in various sound processing contexts, including, inter alia, audio compression applications that aim to reduce transmission bandwidth and storage requirements for audio signals.

An MFC may be represented by, or broken down to, mel-frequency cepstral coefficients (MFCCs). In some embodiments, generating or calculating an MFC and deriving its MFCCs for a given audio signal or input may, e.g., be performed by for example:

Initially, a Fourier transform may be applied to a windowed excerpt of the audio signal to obtain a corresponding spectrum.

The powers or bands of the obtained spectrum may then be mapped onto a mel scale using triangular overlapping windows or cosine overlapping windows to obtain a cepstrum representation of the frequency spectrum (e.g., the MFC).

A logarithm of each power or peak (which may also be referred to as "mel log power") may be computed for each mel frequency within the mel scale.

A discrete cosine transform may then be performed on the set of mel log powers or peaks, treating it as a signal.

The resulting, transformed amplitudes may be taken or selected as the MFCCs.

It should be noted, however, that alternative protocols for generating, calculating, computing, or deriving MFCs and corresponding MFCCs may be used in different embodiments of the invention.

In some embodiments of the invention, the generating of MFCCs may include or involve determining only the first 13 coefficients (although a different number of coefficients may be considered in different embodiments of the invention).

Embodiments of the invention may derive a plurality of features from an MFC or from a plurality of MFCCs, which may be or may include, for example, a plurality of gradient values between the plurality of peaks within the cepstrum, or between the corresponding MFCC values representing the cepstrum.

Figure 9:
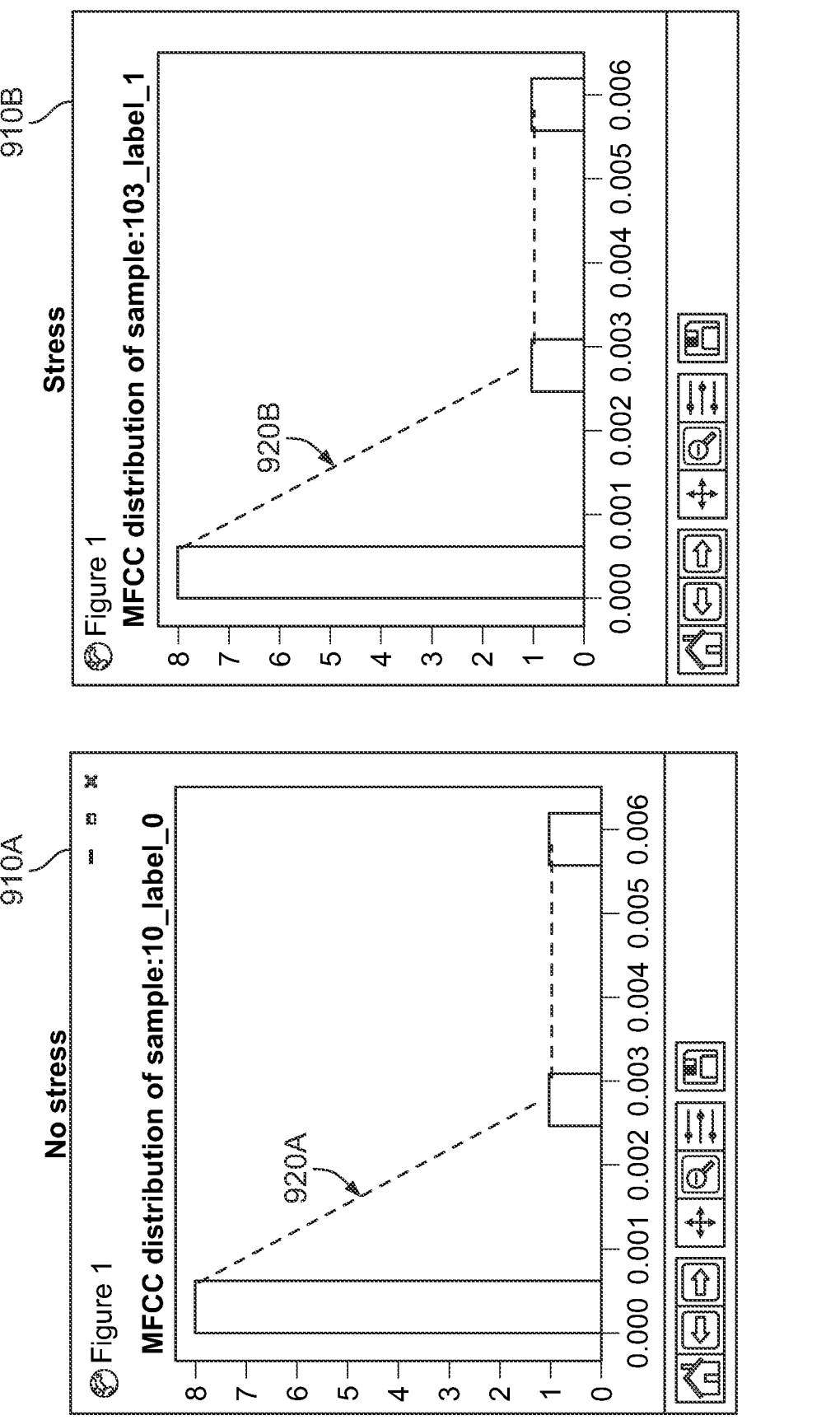
FIG. 9 depicts an example distribution of mel-frequency cepstrum coefficients (MFCCs) for two different samples according to some embodiments of the invention.

FIG. 9 depicts an example distribution of MFCCs for two different samples according to some embodiments of the invention. For the first sample 910A, it may be seen that the MFCC distribution includes values around the ranges of 0.0025-0.0031 and 0.0056-0.0061, respectively. For the second sample 910B, on the other hand, similar values may be seen around the ranges of 0.0020-0.0025 and 0.0059-0.0065, respectively. In other words, despite having similar magnitudes to calculated or extracted MFCCs, samples 910A and 910B may differ, in this example, by certain relative 'shifts' of some MFCCs and/or their distributions along the mel scale (in such manner, and considering, e.g., sample 910B—the middle MFCC is shifted left, and the right MFCC is shifted further right relative to sample 910A). Accordingly, embodiments may categorize or classify different samples as including, describing, or involving "stress" or "no stress"—based on relative shifts in MFCC values or distributions as reflected, e.g., in slopes, gradients, or vectors between neighboring MFCCs. In some embodiments, slope or gradient values may be calculated using a simple linear function formula—while additional or alternative, more complex formulas and/or procedures may be used in other embodiments. In the particular example depicted in FIG. 9, the slope between the left and middle MFCCs for sample 910A (element 920A) may be steeper or larger than that for sample 910B (element 920B) and above a threshold T; e.g., slope 920B<T<slope 920B. Accordingly, and for example based on threshold T, some embodiments of the invention may determine that, for example, sample (or frame) 910A includes "no stress", while sample 920B does include "stress". In some embodiments of the invention, threshold T may be set to a predetermined value, for example based on MFCCs extracted from or calculated for a dataset of samples (such as, e.g., corresponding to a slope between neighboring MFCCs that is above the seventieth percentile for the entire dataset). In other embodiments, threshold T or other classification or categorization criteria may for example be calculated along neural layers (such as for example ones including a sigmoid activation function, although different functions may be used in different embodiments) of a machine learning model or neural network trained using a plurality of samples or data items for which MFCCs and corresponding gradients were calculated (and that for example were tagged, e.g., by a supervisor, as including stress or being stress-free as described herein—although other labeling approaches may be used in different embodiments of the invention), as described herein. It should be noted, however, that additional or alternative qualitative or quantitative conditions or criteria for categorizing or labeling a sample as including stress, or as involving no stress, may be used in different embodiments of the invention.

A numeric matrix representation for the MFCCs may be generated, for example with a size of 13 (as the chosen number of MFCCs, as discussed herein) times the number of time units per buffer. In some embodiments, a time unit of a millisecond (ms) may be used (such that, e.g., an MFCC matrix representing a 3 second long buffer may have the dimensions of 13*3,000). The size of the matrix may thus depend on the length of the buffer being processed. Since the buffer length may vary dynamically for different audio inputs or data items (see, e.g., discussion herein with reference to FIGS. 4, 6-7), the maximum length among all audio inputs (e.g., the length of the longest buffer extracted using a preprocessing protocol or procedure such as described in FIGS. 5-7) may, in some embodiments, be determined and used as part of generating matrix representations of different audio inputs. For example, in order to ensure consistent matrix dimensions across different audio inputs or data items, each given matrix may be determined to conform to the dimensions required to represent the longest audio buffer, and excess cells in the matrix extending beyond the length of the particular buffer considered may be set to zero. Such uniform dimensions across matrix representations of audio data may facilitate subsequent efficient data processing and analysis, and may enable effective comparison and manipulation of extracted features as further described herein.

An example MFCC matrix for an extracted buffer X may be illustrated in Table 1:

TABLE 1

| | Buffer X | | | |
|---|---|---|---|---|
| # | ms(1) | ms(2) | . . . | ms(n) |
| 1 | (0, 8) | (0, 8) | . . . | (0, 0) |
| 2 | (0.0025, 1) | (0.002, 1) | . . . | (0, 0) |
| 3 | (0.005, 1) | (0.0059, 1) | . . . | (0, 0) |
| . . . | . . . | . . . | . . . | . . . |
| 13 | . . . | . . . | . . . | . . . | where ms (n) denotes millisecond number n in the audio buffer considered, and where numbers #denote the number of the relevant MFCC among the 13 MFCCS considered.

For example and as known in the relevant art of audio data analysis and as shown in FIG. 9 herein, MFCCs may be described using a 2-axis distribution-hence each MFCC in Table 1 may, e.g., be described using (x,y) values, describing both magnitude and shifts along the mel-scale, respectively. Given that the longest buffer extracted from a given dataset of input data items is n ms long, and given that the buffer described in Table 1 is shorter than n ms-matrix cells or columns which exceed the length of the buffer under consideration may be filled with 0 values by default. Other matrix formats and representations may be used in different embodiments of the invention.

Slopes between adjacent MFCCs, or MFCC gradients—which may, e.g., be used as audio features in the context of machine learning or neural network model training and/or prediction as described herein—may for example be calculated or derived from a matrix representation such as, e.g., shown in Table 1. In some embodiments of the invention, MFCC values for n consecutive ms may be used to or calculated an MFCC gradient for a given audio frame in an extracted buffer (such as, e.g., the default value of 4 seconds noted herein), such that MFCC gradients or slopes and/or additional or alternative audio features may be attributable and/or associated with each frame, or with a sequence of frames within the extracted buffer. The resulting features may themselves be represented and/or stored as a corresponding matrix or vector describing a given audio frame, such as for example shown in Table 2:

TABLE 2

| Buffer X, Frame (1) | |
| --- | --- |
| # | |
| 1 | −0.7 |
| 2 | 1 |
| 3 | 0.3 |
| . . . | . . . |
| 12 | . . . | where slope or gradient numbers ('#') reach N–1 for N MFCCs (such as for example 13–1=12 based on the contents of Table 1 herein). In some embodiments, gradient values per frame or per a sequence of frames may be calculated, e.g., as a weighted average of MFCC gradients between all time units (e.g., each amounting to 1 ms) included in the relevant frame(s)—and/or, e.g., when an audio item, buffer, or audio part or segment is considered, as a weighted average of the MFCC gradients calculated for the relevant underlying audio frames. One skilled in the art may recognize, however, that additional or alternative calculations of gradient values per frame may be used in different embodiments of the invention. In this context, and while FIG. 9 may be used to illustrate differences in MFCC distribution and gradients between two audio samples—it may similarly be used to illustrate, e.g., such differences between adjacent audio frames.

Figure 10:
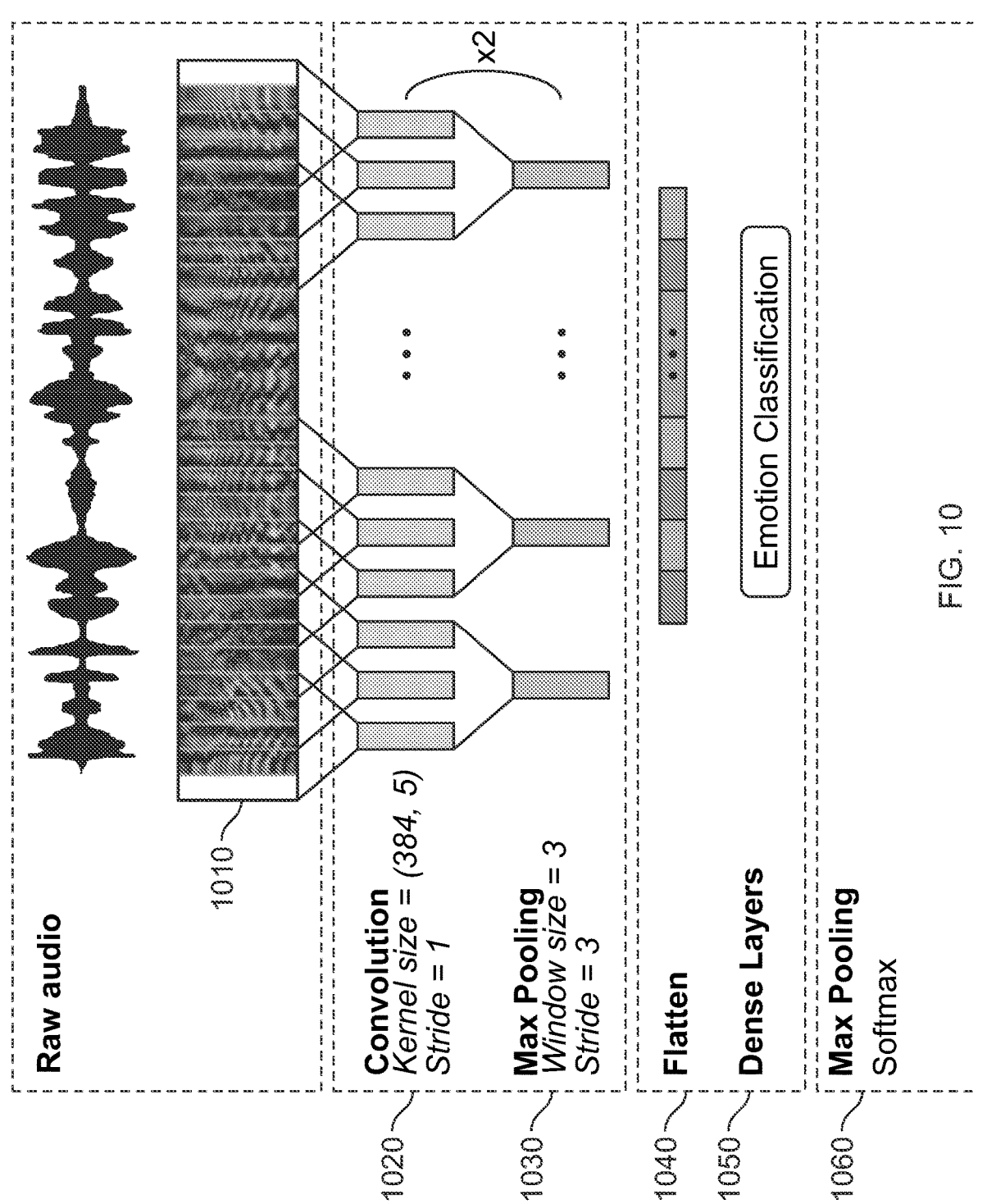
FIG. 10 depicts an example neural network architecture which may be used in some embodiments of the invention.

FIG. 10 depicts an example neural network architecture which may be used in some embodiments of the invention. In some embodiments of the invention, a convolutional neural network (CNN) architecture may be used to perform, e.g., some or all of the different data preprocessing and/or feature extraction steps and protocols discussed herein along dedicated CNN layers—such as for example: the calculating of initial buffer size, running noise reduction procedures and/or filtering audio parts or frames with low SNR, the dynamic calculation of a buffer length, and/or the extraction of an updated audio buffer (layers 1010); various matrix operations including feature extraction, which may involve, e.g., MFC generation and/or MFCC calculation or derivation (layers 1020), and subsequent MFCC gradient calculation or derivation layers 1030) as described herein, as well as, e.g., additional flattening or normalizing matrix dimensions (layers 1040); emotion or stress classification (layers 1050); and scoring of a given sample, data point, or audio portion based on the extracted audio features as described herein (layers 1060). It should be noted that alternative neural network architectures including, e.g., a bidirectional long-short term memory architecture and/or different layer types performing additional or alternative operations along neural layers may be used in different embodiments of the invention.

Some embodiments of the invention may include or involve a supervised learning approach, in which labeling of training data as including stress or being stress free may be performed by a user or supervisor, although other approaches may be used in different embodiments of the invention (for example based on unsupervised learning, which may include, inter alia, clustering samples based on their attributes or features without prior labeling).

Figure 14:
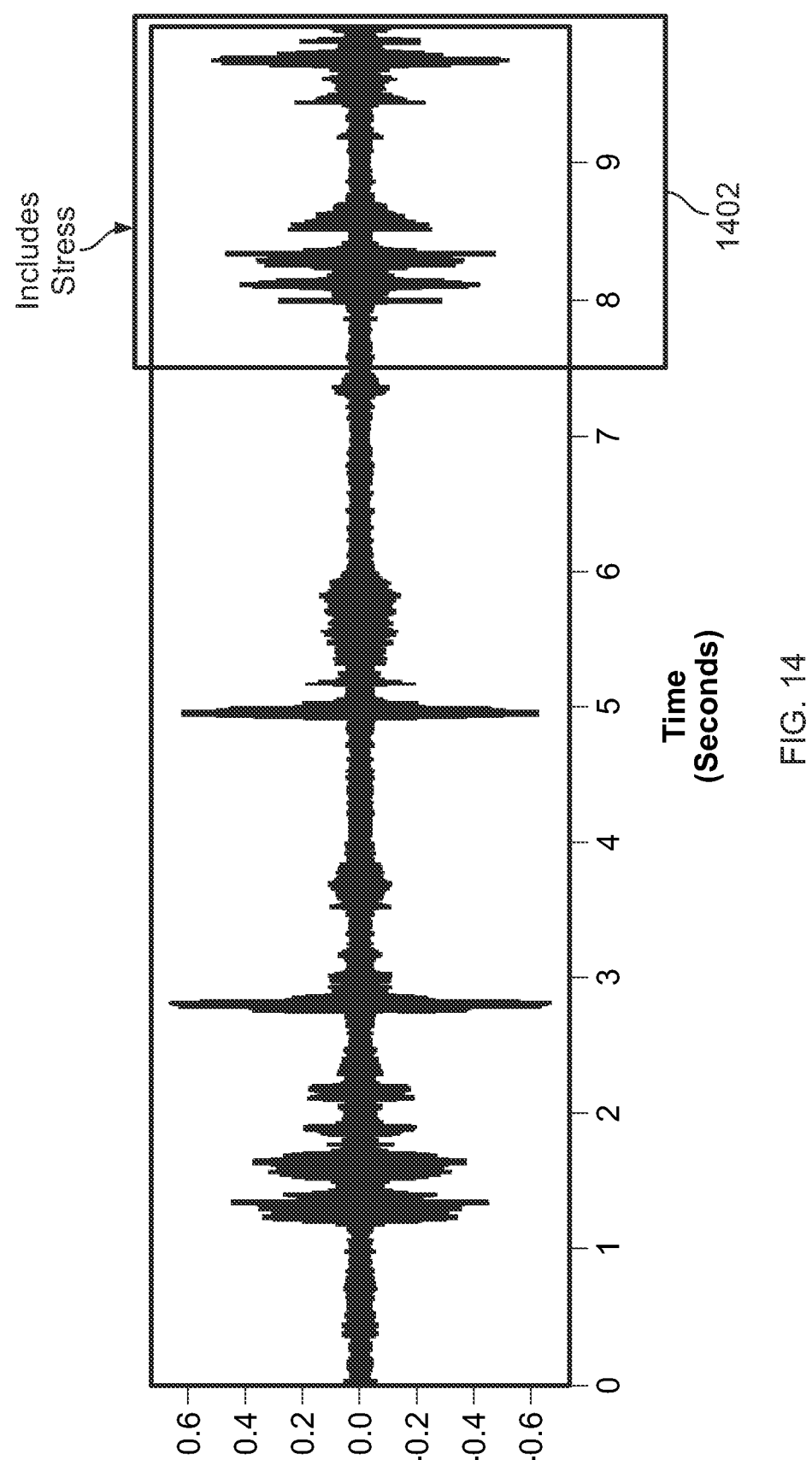
FIG. 14 is a visualization of an example labeled audio data item according to some embodiments of the invention.

FIG. 14 is a visualization of an example labeled audio data item according to some embodiments of the invention. Labeled audio data items such as for example depicted in FIG. 14 or samples may be used for example in training a machine learning or neural network model for detecting or determining stress in audio data. In some embodiments, parts of the audio may be manually identified as including stress, and may accordingly be manually labeled, e.g., by a user or supervisor listening to the audio data item (which may be, e.g., a call in a contact center system such as described with regard to FIG. 11). The user or supervisor may for example provide inputs to mark parts of the audio item, such as part 1402, as including stress (as may be reflected, for example, in the pitch of a contact center agent's voice during that part—although other subjective and/or objective criteria may be used for labeling audio data in different embodiments of the invention). As part of training a machine learning or neural network model for detecting stress in audio data, embodiments of the invention may extract audio features such as MFCCs and/or derive MFCC slopes or gradients from the different parts of the labeled audio items, such as for example according to the various protocols and procedures described herein-such that the model may be trained based on the features associated with labeled items and/or portions. Other model training protocols and approaches may be used in different embodiments of the invention.

Following the training of a machine learning or neural network model for detecting stress in audio data, embodiments of the invention may be used for predicting stress levels or scores, or for automatically classifying audio data items or interactions as including "stress" or being "stress free" . . . . In some embodiments, scores may be calculated along appropriate neural network layers (such as for example a SoftMax layer as depicted in FIG. 10), such that each input data item or sample (which may describe, e.g., a call or interaction) may be given a score between 0.00-1.00. Scores calculated by embodiments of the invention may accordingly be used or interpreted as a probability that a given sample includes stress or is stress free. For example, a trained neural network model may calculate a score of 0.70 for a given sample, which may indicate that the sample has a probability of 70% of including stress (or an inverse probability of 30% of being stress free). Probabilistic scores may subsequently be normalized or "flattened" to output a binary "stress"/"stress free" classification—for example given a probabilistic threshold (e.g., having a value 0.8) above which samples would be classified as including stress (a sample for which a score of 0.7 was calculated may therefore be categorized as stress free).

In some embodiments, following the training of a machine learning or neural network model for detecting stress in audio data, and before performing predictions and/or scoring input audio data, embodiments may verify that a minimum amount of training data was used in the training phase (such as for example including ~48-52 training samples, segments, or examples for each "stress" or "no stress" class), e.g., to ensure or verify that results provided by the model may be accurate and robust. Additional or alternative quality control steps may be included in different embodiments of the invention.

Additionally or alternatively to predicting whether a given audio item, sample, or buffer may or may not include stress, some embodiments of the invention may predict or identify particular parts or segments within input audio items or buffers that may or may not include stress—for example using the protocols and procedures described herein which may apply similarly to full-length audio items or buffers as well as to their underlying parts or portions, e.g., since MFCC gradients indicative of stress may be calculated or computed per each frame in a given audio data item and/or its subparts or subsegments (thus, in this context, labeled training data such as for example depicted in FIG. 14, and a corresponding neural network architecture such as for example depicted in FIG. 10 may be used for scoring both samples or buffers and their underlying segments and portions). Additional or alternative protocols and procedures for scoring and classifying or categorizing input samples, audio items, or extracted buffers, as well as portions or parts of such inputs, may be used in different embodiments of the invention.

In some embodiments, audio data items used for training, as well as audio data input to the model for prediction, may be received from an appropriate $3^{rd}$ party database or computing device. For example, a computing device such as, e.g., computing device 100 or a contact center system (as further discussed herein) may receive audio data items over a data network using a network interface controller (NIC) or any other suitable component. One skilled in the art would recognize that many options and architectures for network-based, distributed data and processing systems (including, e.g., cloud based systems) may be used in different embodiments of the invention. Such separation and distribution of computational tasks (associated with computational resources such as, e.g., memory and storage units, processing units, and the like) may be beneficial, for example, in contexts where large datasets and deep neural network architectures are used-which may require extensive use of computational resources and may not be suitable for execution, e.g., on a single general purpose computer system. In such contexts, embodiments of the invention may require, for example, using 3rd party computer systems for storage, and using a high-performance cluster (including, e.g., a plurality of interconnected processing cores and memory units) for data processing and neural network based predictions such as described herein.

An example use case of stress detection in audio data according to some embodiments of the invention may relate to organizations such as call centers, which may create and/or store "interactions", which may be represented, e.g., as video or audio data items. Such interactions data may be or may describe conversations or data exchanged between, typically, an agent or representative (typically human) of the company and a customer. Interactions may generally include, for example, voice, audio or video recordings of conversations, and/or other data such as text, e-mail or instant messaging exchanges. Interactions may be converted from one format to another, and may include more than one different format of data: e.g., an interaction may include an audio conversation and/or a text version of that conversation created by for example automatic speech recognition (ASR).

FIG. 11 is a block diagram of remotely connected computer systems according to some embodiments of the present invention. While FIG. 11 shows such a system in the context of a contact center, it should be noted that different embodiments of the invention may be used in other contexts. Incoming interactions 20 (e.g. conversations, telephone calls, interactive voice response interactions, etc.) among people 3 (e.g., customers) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate external user equipment 4 to communicate with agents 5 via contact center 10; and agents 5 may operate agent terminals 6 for that communication and other purposes. Incoming interactions 20 may be pre-processed and may enter the system as text data, or may be converted to text via ASR module 22.

User equipment 4, agent terminals 6 and user terminals 8 may include computing or telecommunications devices such as personal computers or other desktop computers, conventional telephones, cellular telephones, portable or tablet computers, smart or "dumb" terminals, etc., and may include some or all of the components such as a processor shown in FIG. 1.

Interaction data or documents may be stored, e.g., in files and/or databases. For example logger 40, menus logger 42, and web-page logger 44 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10.

Analysis center 50 may perform functions such as those shown in FIGS. 2-10, and 13 herein.

One or more networks 12 may connect equipment or modules not physically co-located, for example connecting external user equipment 4 to contact center 10, and contact center 10 to analysis center 50 and agent terminals 6. Agent terminals 6 may thus be physically remote from user equipment 4. Networks 12 may include for example telephone networks, the Internet, or other networks. While in FIG. 11 contact center 10 is shown passing data to analysis center 50, these modules may communicate via a network such as networks 12.

Web block 34 may support web interactions over the Internet (e.g. operate web pages which may be executed in part on user equipment), IVR block 32 may provide menus and other information to customers and for obtaining selections and other information from customers, and recorder 34 may process or record voice sessions with customers. It may be appreciated that contact center 10 presented in FIG. 11 is not limiting and may include any blocks and infrastructure needed to handle voice, text (SMS (short message service), WhatsApp messages, chats, etc.) video and any type of interaction with costumers.

Each of modules and equipment such as contact center 10, ASR module 22 PBX 25, IVR block 32, voice interactions block or recorder 30, menus logger 42, connect API 34, analysis center 50, external user equipment 4, and agent terminals 6, user terminals 8 and other modules discussed herein may be or include a computing device such as included in FIG. 1, although various units among these modules may be combined into one computing device. Agent terminals 6 and user equipment 4 may be remote or physically separate computer systems communicating and/or connected over network 12.

Figure 12:
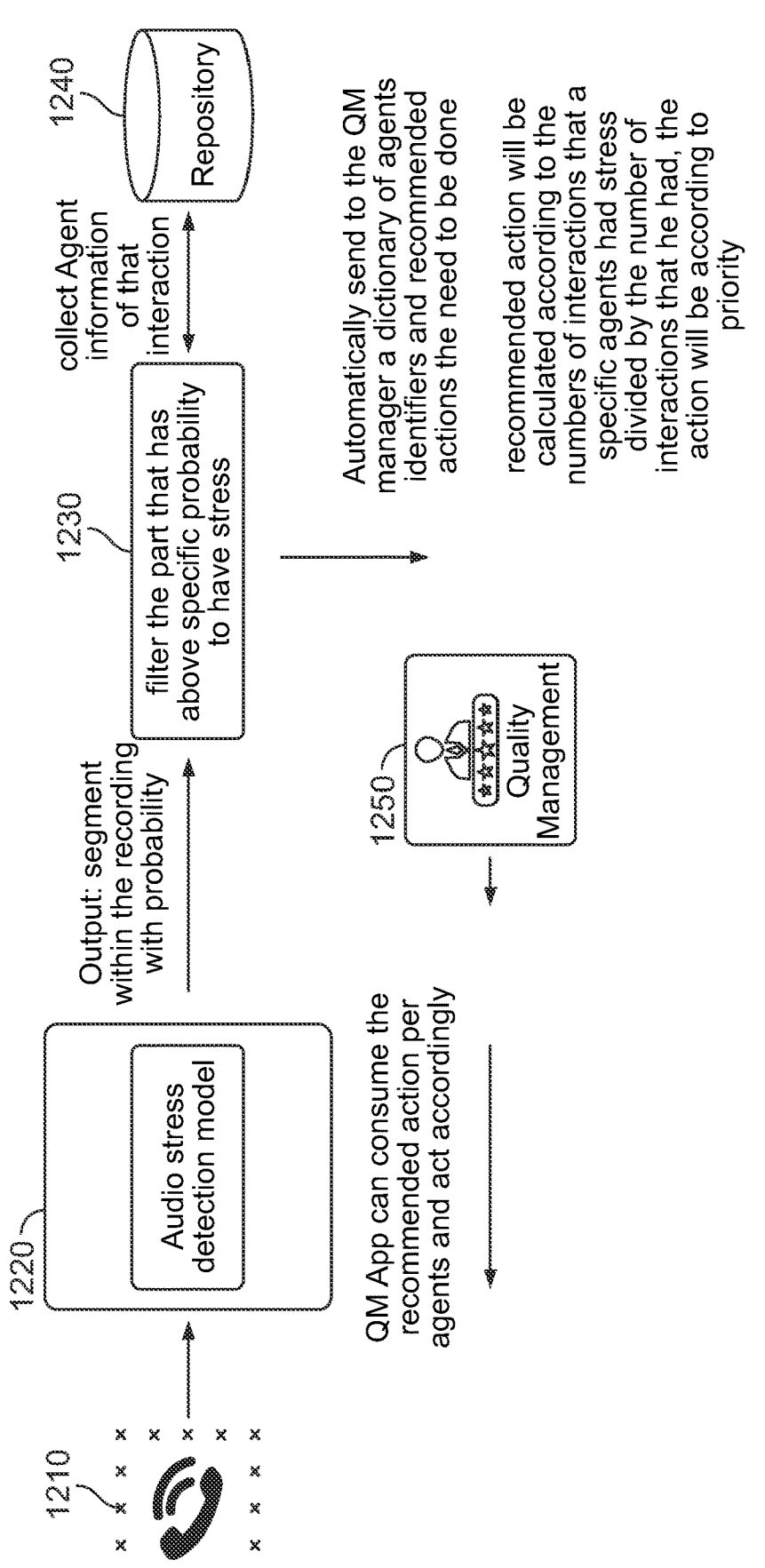
FIG. 12 depicts an example stress detection system integrated with a quality management system according to some embodiments of the invention.

FIG. 12 depicts an example stress detection system integrated with a quality management system according to some embodiments of the invention. A given incoming call or interaction 1210 may be received by stress detection system or model 1220 within contact center 10 and/or (which may be implemented, for example, in analysis center 50, e.g., using an appropriate software infrastructure such as for example Enlighten studio by Nice Ltd.). Based on the various protocols and procedures outlined herein (including, e.g., the calculating of an initial buffer length, the dynamic calculation an extraction of an audio buffer, the training and/or execution of a machine learning model-such as, e.g., according to the example neural network architecture and labeled training data format provided herein-which may be used for calculating and determining stress based on MFCCs and/or their gradients), embodiments may output an extracted audio buffer or segment having a probability of including stress such as for example determined according to the protocols and/or procedures described herein; embodiments may additionally or alternatively filter a part, subsection, or subsegment of the output buffer or segment having a specific probability of including stress (e.g., above a predetermined threshold as described herein; step 1230); the filtered part of subsegment may then be stored in a repository 1240, and/or additional data or metadata may be mation describing past interactions handled by relevant agents—including, e.g., stress levels or scores detected or predicted for incoming calls or interactions for a given timeframe (such as for example 2 weeks) using some embodiments of the invention.

For example, recommended or automated actions for a given agent may be determined based on the ratio of stressful interactions and total interactions documented or analyzed for that agent (e.g., as stored in repository 1240)—as well as based on additional attributes or characteristics describing the call under consideration (which may for example include call "priority" or urgency information or ranking as may be determined or calculated using various protocols and procedures known in the art). In some embodiments, automated actions may include, e.g., terminating or rerouting incoming call 210 to a different agent by contact center 10 (which may involve, e.g., remote computer 1250 transmitting an instruction to contact center 10 to perform the automated action), for example using an IVR system 32; automatically rescheduling work shifts or hours, or reassigning work tasks for a given agent (e.g., from night hours to morning hours, which may for example be considered to induce less stress on the agent involved)—which may, e.g., involve updating a work schedule database or repository; automatically sending a notification to a supervisor including or describing stress statistics or results for relevant agents; recommending or suggesting taking a break or time off, providing a link to a meditation website or app, and the like.

In one example, incoming call 1210 may be automatically rerouted to a different agent if stress is detected for that call, and if the ratio (stressful interactions)/(all interactions)=0.3 for the agent handling the call.

In another example, stress detection system 1220 may be used to determine or detect stress in a plurality of interactions involving two agents A and B and create or generate a report or dictionary such as for example demonstrated in Table 3 (which may documented or included in repository 1240):

TABLE 3

| Agent Name | Agent ID | # Total Interactions | # Stress Including Interactions | Severity | Recommended Action |
|---|---|---|---|---|---|
| A | 3 | 15 | 10 | $10/15 > T_1 = 0.6 \rightarrow$ High | Reroute incoming call |
| B | 5 | 30 | 8 | $8/30 < T_2 = 0.4 \rightarrow$ Low | Assign agent to training program | received from the repository (such as for example metadata describing an agent involved in incoming call 1210, and including, for example, statistical information on past interactions and stress detections). Embodiments may then transmit or send a dictionary or report of agents, agent identifiers, and recommended or automated actions which may be taken based on the report. The dictionary or report may be sent or transmitted to remote computer 1250 (which may be for example among user terminals 8) which may for example operate a quality management (QM) software suite and/or be operated by a QM supervisor. Remote computer 1250 may receive and process the dictionary or report, and accordingly trigger or execute specific recommended or automated actions-which may, e.g., be calculated or determined based on, or according to, historical data and/or statistical inforwhere $T_1$ and $T_2$ are threshold for high and low levels of severity, respectively (e.g., if the ratio of the number of stress including interaction to the total number of interactions is above $T_1$—embodiments may determine a high severity level; if the ratio is below $T_2$—embodiments may determine a low severity level). The recommended actions in Table 3 may correspond to the severity level calculated for each of agents A and B to determine the best recommended action for the different agents considered, such that, e.g., rerouting an incoming call may only be performed for agents having a high severity level, and so forth.

It should be noted that additional or alternative system architectures, including, e.g., integrations with different QM and/or workforce management (WFM) components, and the like, may be included in different embodiments of the invention.

Figure 13:
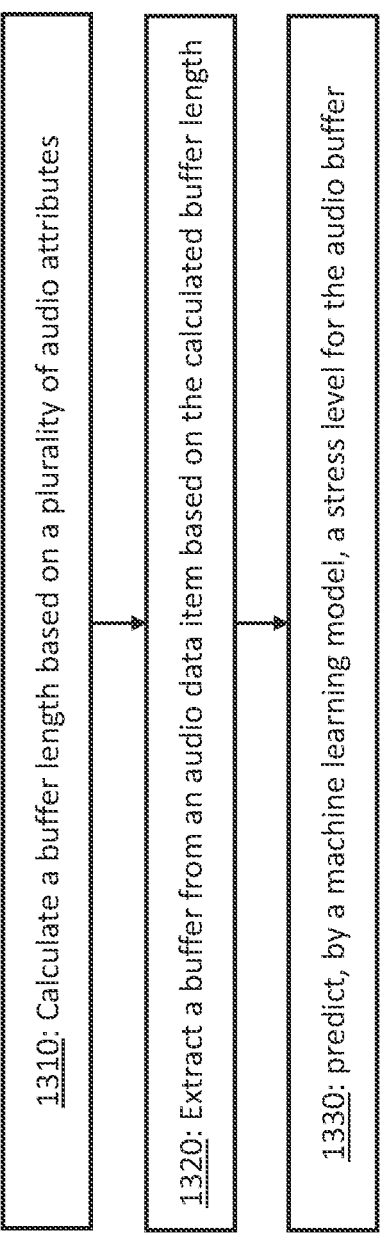
FIG. 13 is a flowchart depicting an example method for detecting stress in audio data according to some embodiments of the invention.

FIG. 13 is a flowchart depicting an example method for detecting stress in audio data according to some embodiments of the invention. In 1310, embodiments of the invention may calculate a buffer size or length based on a plurality of audio attributes or characteristics (e.g., ones of an audio data item or file given as input). Embodiments may then extract an audio buffer or segment from an audio data item (which may be, e.g., the item of which attributes or chrematistics may be considered in 1310) based on the calculated buffer length/size (1320). Embodiments may then predict, by a machine learning model (which may, for example, be implemented in an CNN architecture as described herein) a stress level or score for the extracted buffer or segment, for example according to the formats levels and scores described herein (1330). Additional or alternative operations or steps may be included in different embodiments of the invention and corresponding stress detection methods.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing." "computing." "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for audio stress detection, the method comprising:

in a computerized system comprising a memory and a processor:

calculating, by the processor, a buffer length based on one or more audio attributes;

extracting, by the processor, an audio buffer from an audio data item based on the calculated buffer length;

calculating, by the processor, a dynamic buffer length using one or more overlapping frames within the audio buffer comprising:

cleaning, by the processor, the audio buffer, the cleaning comprising removing one or more audio parts based on a signal-to-noise threshold;

dividing, by the processor, the cleaned buffer into the one or more overlapping frames;

comparing, by the processor, the dynamic buffer length to a default frame length value; and adjusting, by the processor, the dynamic buffer length based on the comparison and based on one or more of the overlapping frames;

extracting, by the processor, an updated buffer from the audio buffer based on the dynamic buffer length; and predicting, by a machine learning model, a stress level for the audio buffer based on the updated buffer.

2. The method of claim 1, wherein the one or more audio attributes comprise: an audio compression factor, an audio frame duration factor, and a sample rate factor.

3. The method of claim 1, wherein the calculating of a dynamic buffer length comprises:

comparing, by the processor, the dynamic buffer length to a frame overlap length; and if the dynamic buffer length is smaller than the overlap length, modifying, by the processor, the dynamic buffer length based on the default frame length, a duration for the audio data item, and the frame overlap length.

4. The method of claim 1, comprising:

generating, by the processor, a cepstrum from the extracted buffer; and deriving, by the processor, one or more features from the cepstrum, the features comprising one or more gradient values between one or more coefficients representing the cepstrum; and wherein the predicting of a stress level is performed based on the features.

5. The method of claim 4, wherein the machine learning model is a convolutional neural network model, and wherein at least one of: the generating of a cepstrum, and the deriving of one or more features, are performed along one or more convolutional layers.

6. The method of claim 1, comprising automatically routing a call based on the predicted stress level, or automatically terminating the call based on the predicted stress level.

7. A computerized system for audio stress detection, the system comprising:

a memory;

and a computer processor configured to:

calculate a buffer length based on one or more audio attributes;

extract an audio buffer from an audio data item based on the calculated buffer length;

calculate a dynamic buffer length using one or more overlapping frames within the audio buffer, wherein the processor is to:

clean the audio buffer, the cleaning comprising removing one or more audio parts based on a signal-to-noise threshold;

divide the cleaned buffer into the one or more overlapping frames;

compare the dynamic buffer length to a default frame length; and adjust the dynamic buffer length based on the comparison and based on one or more of the overlapping frames;

extract an updated buffer from the audio buffer based on the dynamic buffer length; and predict, by a machine learning model, a stress level for the audio buffer based on the updated buffer.

8. The system of claim 7, wherein the one or more audio attributes comprise: an audio compression factor, an audio frame duration factor, and a sample rate factor.

9. The system of claim 7, wherein the calculating of a dynamic buffer length comprises:

comparing, by the processor, the dynamic buffer length to a frame overlap length; and if the dynamic buffer length is smaller than the overlap length, modifying, by the processor, the dynamic buffer length based on the default frame length, a duration for the audio data item, and the frame overlap length.

10. The system of claim 7, wherein the processor is to:

generate a cepstrum from the extracted buffer; and derive one or more features from the cepstrum, the features comprising one or more gradient values between one or more coefficients representing the cepstrum; and wherein the predicting of a stress level is performed based on the features.

11. The system of claim 10, wherein the machine learning model is a convolutional neural network model, and wherein at least one of: the generating of a cepstrum, and the deriving of one or more features, are performed along one or more convolutional layers.

12. The system of claim 7, wherein the processor is to automatically route a call based on the predicted stress level, or automatically terminating the call based on the predicted stress level.

13. A method for audio stress detection, the method comprising:

in a computerized system comprising a memory and a processor:

computing, by the processor, a segment size based on one or more audio characteristics;

extracting, by the processor, an audio segment from an audio file based on the calculated segment size;

computing, by the processor, a dynamic audio segment size using one or more overlapping frames within the audio segment, comprising:

cleaning, by the processor, the audio segment, the cleaning comprising filtering one or more audio parts based on a signal-to-noise threshold;

dividing, by the processor, the cleaned segment into the one or more overlapping frames;

comparing, by the processor, the dynamic segment size to a default frame size; and adjusting, by the processor, the dynamic segment size based on the comparison and based on one or more of the overlapping frames;

extracting, by the processor, an updated segment from the audio segment based on the dynamic segment size; and predicting, by a machine learning model, a stress score for the audio segment based on the updated segment.

14. The method of claim 13, wherein the one or more audio characteristics comprise: a frame factor, a default frame size, and a call ratio.

\* \* \* \* \*